Patented Feb. 26, 1952

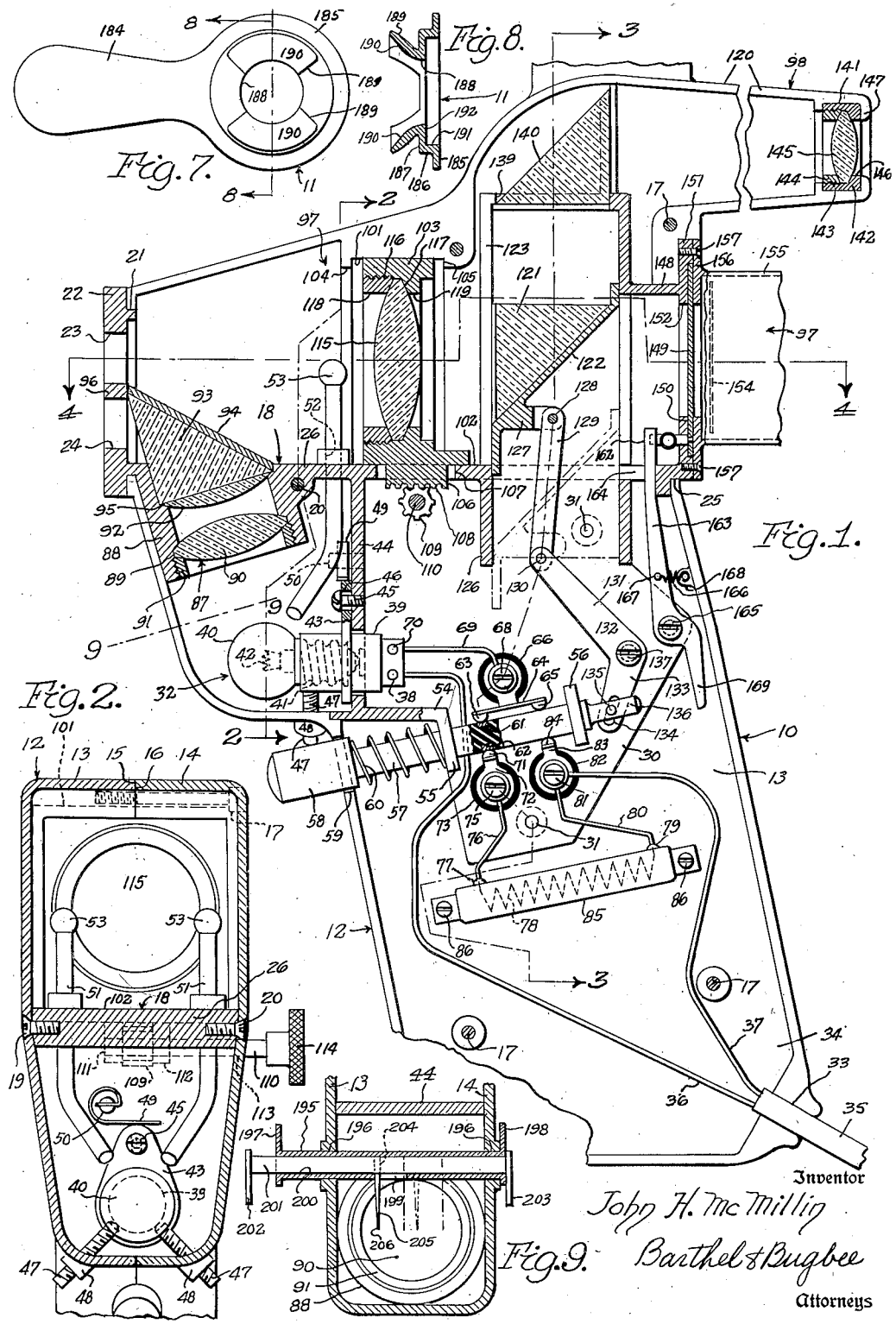

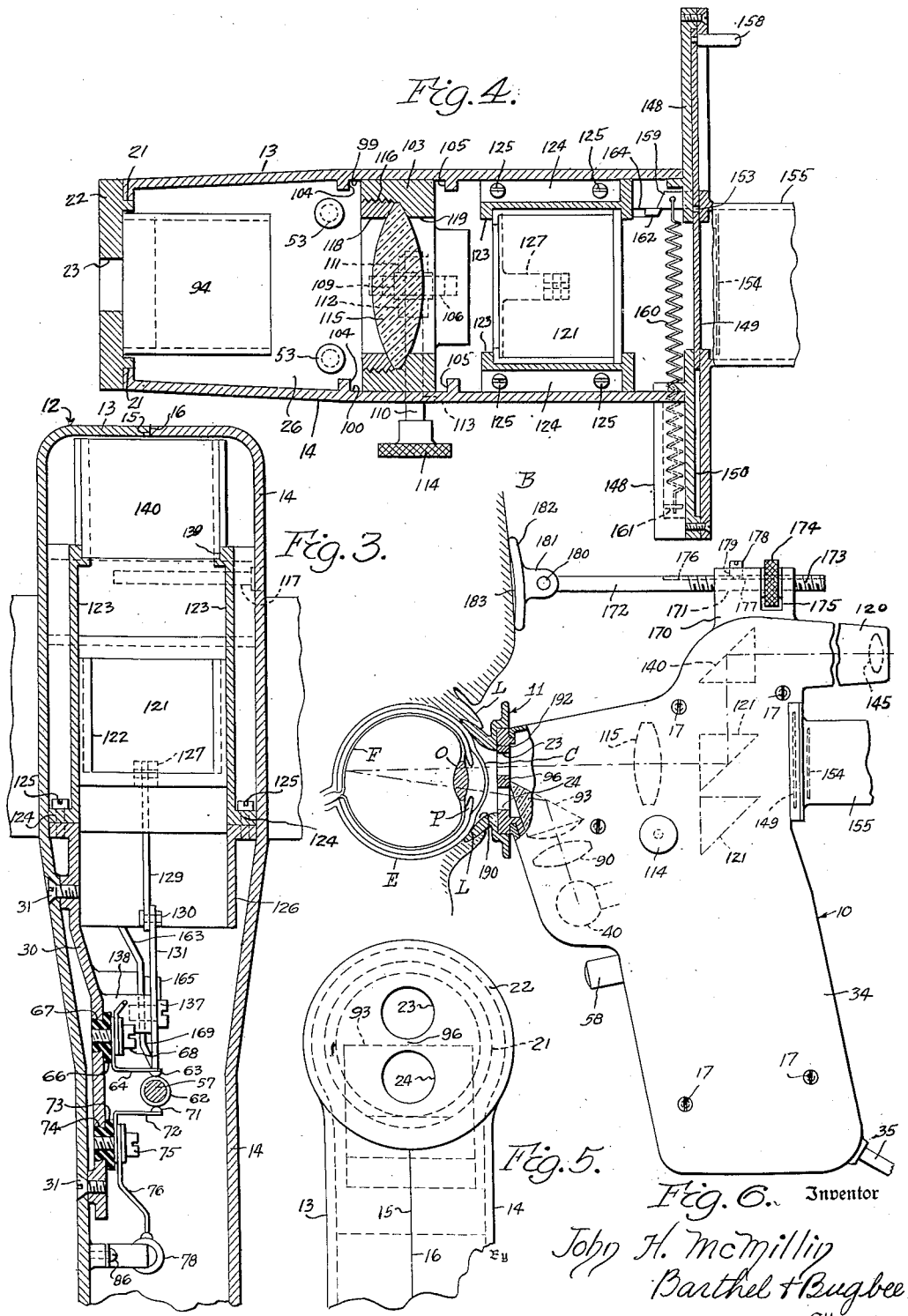

2,586,973

UNITED STATES PATENT OFFICE 2,586,973

FUNDUS CAMERA, INCLUDING EYE FIXATION MEANS

John H. McMillin, Monroe, Mich.

Application March 17, 1947, Serial No. 735,139

2 Claims. (Cl. 95—11)

This invention relates to photography, and in particular, to cameras for photographing the fundus of the eye, namely the portion of the interior of the eye which lies opposite and in back of the pupil.

One object of this invention is to provide a fundus camera which is so arranged as to eliminate the reflection of light from the cornea of the eye and enables photographs to be taken of the interior of the eye by means of light furnished by a self-contained illuminating system.

Another object is to provide a fundus camera which is light in weight, compact and sufficiently small to be held in the hand while the photographs are being taken.

Another object is to provide a fundus camera which is used in conjunction with a speculum or rest placed in contact with the eyeball outside the margins of the cornea and beneath the eyelids, the eyeball being previously anesthetized to enable the patient to tolerate the speculum.

Another object is to provide a fundus camera wherein the interior of the eye is illuminated for focussing purposes by an incandescent lamp which, after focussing, is subjected momentarily to a current overload so as to provide a sudden increase of illumination of short duration while taking the photograph.

Another object is to provide a fundus camera wherein a pair of luminous fixation objects are provided in the antechamber of the camera on which the patient fixes his gaze in alternate succession for alternate exposures, rotating his eyeball from one to the other in so doing, and thereby enabling stereoscopic photographs to be taken.

Another object is to provide a fundus camera, as set forth in the preceding objects, wherein a single trigger or operating member when actuated first illuminates the lamp at normal illumination for focussing purposes, and when further depressed, super-illuminates the lamp with an overload current and at the same time, actuates the shutter to expose the film.

Another object is to provide a fundus camera, as set forth in the object immediately preceding, wherein the same trigger or operating member also moves a prism of the focussing system out of the path of the rays to the shutter immediately before the shutter is released.

Another object is to provide a fundus camera, as set forth in the preceding objects, wherein the light from the illuminating system enters the eye through one aperture in the nose of the camera and re-enters the camera through another aperture on its way to the viewing system or to the film, the two apertures being separated from one another by an opaque bridge portion which masks out the image of the lamp from the cornea acting as a convex mirror and prevents this brilliant image from being photographed on the film and therefore from interfering with the photographed image of the fundus.

In the drawings:

Figure 1 is a central vertical section through a fundus camera according to a preferred form of the invention, with the brow rest omitted and with the movable prism of the viewing system shown in its lowered or viewing position and with the lamp normally illuminated;

Figure 2 is an approximately vertical section taken along the zigzag line 2—2 in Figure 1;

Figure 3 is an approximately vertical section taken along the zigzag line 3—3 in Figure 1;

Figure 4 is an approximately horizontal section mainly along the optical axis of the camera and taken along the zigzag line 4—4 in Figure 1;

Figure 5 is a fragmentary front elevation of the nose of the camera;

Figure 6 is a diagrammatic side elevation of the fundus camera of Figures 1 to 5 inclusive, showing the nose of the camera resting against a speculum which engages the eyeball beneath the eyelid, and also showing the brow rest in use;

Figure 7 is a front elevation of a speculum or camera rest shown in use in Figure 6; and Figure 8 is a central vertical section through the speculum shown in Figure 7, taken along the line 8—8 therein.

Figure 9 is an approximately horizontal section through a modified visual fixation device adapted to be inserted in the plane 9—9 of Figure 1.

Referring to the drawings in detail, Figures 1 and 3 show a fundus camera, generally designated 10, according to a preferred form of the invention and used in conjunction with a speculum or rest, generally designated 11 (Figures 7 and 8). The camera 10 is contained in a casing 12 consisting of oppositely-facing cooperating casing halves 13 and 14 (Figure 3) engaging one another along their meeting edges 15 and 16 respectively. The casing halves 13 and 14 are held together by screws 17 (Figures 2 and 6) which pass through the former and are threaded into the latter.

Frame structure

The optical elements and other working parts of the camera in the interior thereof are for the most part mounted upon a frame structure or chassis, generally designated 18, of irregular shape occupying the interior of the camera and secured by the screws 19 and 20 (Figure 2) to the casing halves 13 and 14 respectively. The forward portion of the frame structure 18 passes through an aperture 21 and terminates in a nose plate 22 in the form of a circular disc with vertically spaced apertures 23 and 24. The rearward portion of the frame structure 18 passes through an aperture 25 in the rearward wall of the casing 12, and is in part supported by the edges of the apertures 21 and 25.

The frame structure 18 is provided with a horizontal partition portion 26 which divides the casing 12 into an upper compartment occupied by the photographic system and a lower compartment occupied by the illumination system. Extending downward from the partition portion 26 is a plate-like portion 30 which is secured by the screws 31 to the casing half 13.

Illuminating system

The illuminating system, generally designated 32, for illuminating the interior of the eye in order to provide light for photographing the fundus, is housed in the lower portion of the casing 12 (Figures 1, 2 and 3). The casing 12 is provided with a hole 33 in the lower end of the handle portion 34 thereof. Passing through the hole 33 into the interior of the camera is a cable 35 which is connected externally to a source of electric current and which is provided with a pair of conductors 36 and 37 respectively. The conductor 36 leads to one terminal 38 of an incandescent lamp socket 39 having an incandescent lamp 40 threaded into the socket bore 41 and having a filament 42 which is illuminated in the ordinary manner when supplied with electric current through the conductors 36 and 37.

In order to provide an adjustment for centering the filament 42 of the lamp 40 relatively to the lens system of the illuminating system 32, the socket 39 is mounted upon a movable plate 43 which is secured to the downwardly extending portion 44 of the frame structure 18 by a screw 45 passing through an enlarged hole 46. A pair of adjusting screws 47 (Figure 2) passing through threaded holes in the bosses 48 in the casing halves 13 and 14 enables the plate 43 and socket 39 to be shifted to and fro until its position of best adjustment is reached relatively to the optical system described below. A leaf spring 49 mounted on a stud 50 on the frame portion 44 engages the top of the swinging plate 43 and urges the latter downward toward the adjusting screws 47.

In order to provide fixation points for the patient's gaze in taking stereoscopic photographs, a pair of bent rods 51 of transparent plastic material are mounted with their lower ends adjacent the lamp 40 and lead upward through vertical holes 52 in the partition portion 26 of the frame structure 18. The rods 51 are provided at their upper ends with spherical knobs 53 which serve as fixation points, as described below in connection with the operation of the instrument. The rods 51 conduct light upward from the lamp filament 42 to the knobs 53 and illuminate the latter, which are preferably of a deep red color in order not to fog the patient's vision.

Extending horizontally rearward from the frame structure portion 44 at the bottom thereof is a portion 54 having a downwardly extending projection 55 which is connected to the plate-like portion 30 and is parallel to a projection 56 likewise connected to the portion 30. The projections 55 and 56 are bored in alignment to receive an operating plunger rod 57 carrying a push button or head 58 which extends through an aperture 59 in the casing 12. The rod 57 and push button 58 are urged to the left by a coil spring 60 surrounding the rod 57 and mounted between the projection 55 and the push button 58.

The rod 57 is of insulating material such as plastic or hard rubber and is provided with a groove 61 containing an annular band 62 of conducting material, such as copper or brass. Engageable with the upper side of the band 62 is a contact 63 mounted on a spring arm 64 which also carries a second contact 65 mounted to the rear of the first contact 63. The spring arm 64 (Figures 1 and 3) is mounted upon an in insulating stud 66 inserted in an aperture 67 in the plate-like portion 30. A screw 68 secures the spring arm 64 against the insulating stud 66 and also in engagement with a conductor 69 which runs to the terminal 70 of the electric light socket 39. The spring arm 64 is preferably of spring brass or other resilient material.

Also simultaneously engageable with the band 62 (Figures 2 and 3) is a contact 71 mounted on a spring arm 72 which is secured to an insulating stud 73 mounted in an aperture 74 in the plate-like portion 30 by a screw 75 threaded therein. The screw 75 also engages the upper end of a conductor 76, the lower end of which is connected to one terminal 77 of a resistor 78, the opposite terminal 79 of which is connected by a conductor 80 to a screw 81. The latter, like the screw 75, is threaded into an insulating stud 82 mounted in an aperture in the plate-like portion 30 and also securing thereto a spring arm 83 carrying a contact 84 mounted immediately oppositely opposite the contact 65 so that the contacts 84 and 65 are interconnected by the conducting band 62 on the rod 57 when the push button 58 is pushed inward. The screw 81 also engages and holds the upper end of the conductor 37. The casing 85 of the resistor 78 is secured by the screws 86 to the casing half 13.

The illuminating system 32 also includes a condensing lens system, generally designated 87, which projects the light from the incandescent lamp 40 through the aperture 24 (Figure 1) into the interior of the eye. For this purpose, the frame structure 18 is provided with a downwardly inclined tubular portion 88 which is provided at its lower end with an annular recess 89 serving to receive a convex condensing lens 90, the latter being held in place by a retaining ring 91 threaded therein. Also mounted in the tubular portion 88 is a second convex condensing lens 92 spaced axially away from the condensing lens 90.

Mounted adjacent the condensing lens 92 is a right-angle reflecting prism 93, the hypotenuse surface of which is preferably tilted and backed by a cover plate 94 holding the prism 93 and lens 92 in an annular recess 95. The aperture 24 in the nose plate 22 opens into the upper portion of the prism 93 and serves to pass the light reflected by it into the interior of the eye. The bridge portion 96 between the two apertures 24 and 23 (Figures 1 and 5) is of a sufficient width to serve as a mask for blocking out the image of the lamp 40 which would otherwise be reflected directly from the cornea of the eye into the photographic objective and thence recorded upon the film.

Photographic and viewing system

The photographic system, generally designated 97, occupies the upper part of the casing 12 and cooperates with a viewing system, generally designated 98, provision being made for shifting rapidly from one system to the other as the focussing operations are completed and the exposure is made. The side walls of the casing halves 13 and 14 (Figure 4) are provided with parallel vertical guide surfaces 99 and 100 and also with upper horizontal guide surfaces 101 (Figures 1 and 2), the surfaces 101 lying in the same plane partly on the casing half 13 and partly on the casing half 14 so as to form continuations of one another. A lower guide surface 102 parallel to the guide surfaces 101 is formed on the frame structure or chassis 18.

Mounted in the rectangular opening formed by the guide surfaces 99 to 102 inclusive is a rectangular lens mount 103 which is reciprocable horizontally to and fro between forward and rearward abutments 104 and 105 respectively (Figures 1 and 4). The lens mount 103 is provided with an extension 106 projecting downward through an opening 107 in the frame structure 18 and having rack teeth 108 meshing with the teeth of a pinion 109 mounted on a horizontal shaft 110. The shaft 110 is journaled in spaced parallel bearing brackets 111 and 112 secured to and extending downward from the frame structure 18 (Figure 2) on opposite sides of the pinion 109. One end of the shaft 110 extends outward through a hole 113 in the casing half 14 and terminates in a knurled head 114. By rotating the knurled head 114 with the fingers, the lens mount 103 is caused to move to and fro along its guide surfaces 99 to 102 for focussing purposes.

Any suitable type of photographic objective may be mounted in the lens mount 103, a single double-convex lens 115 being shown merely for purposes of simplification. The ordinary highly-corrected photographic lens usually consists of two or more components and sometimes consists of several spaced doublets or triplets. The photographic objective 115 is mounted in the threaded counterbore 116 (Figure 1) and is held in position against an annular flange 117 by a threaded retaining ring 118 mounted in the counterbore 116. The annular flange 117 is provided with an aperture 119 through which the rays of light pass either to the viewing system or to the film.

The viewing system 98 occupies the extreme upper portion of the casing 12 and is mounted partly in a tubular casing extension 120 at the top of the instrument. In order to shift from the photographic system 97 to the viewing system 98, a vertically reciprocable right-angle prism 121 is provided (Figure 1). The prism 121 is mounted in a cell 122 which is reciprocable vertically within an elongated cage-like guide frame 123. The guide frame 123 is provided with lower edge flanges 124 by which the frame 123 is secured to the partition portion 26 of the frame structure 18, as by the screws 125. Extending downward from the partition portion 26 is a tubular portion 126 of rectangular cross-section which is co-extensive with the guide frame 123 and forms a continuation thereof for the reciprocation of the cell 122 containing the prism 121.

An arm portion 127 extends horizontally rearward from the prism cell 122 and terminates in a yoke portion carrying a pivot pin 128. Pivotally connected to the pivot pin 128 is the upper end of a link 129, the lower end of which is connected by a pivot pin 130 to the upper portion 131 of a bell crank lever 132. The lower portion of the bell crank lever 132 is provided with an elongated slot 134. A pin 135 mounted in the reduced diameter end portion 136 of the plunger rod 57 engages the slot 134 and swings the bell crank lever 132 around a pivot stud 137 which in turn is threaded into a boss 138 on the plate-like portion 30 of the frame structure 18. As a consequence, when the switch button 58 is pushed inward, the reciprocation of the plunger rod 57 and the consequent swinging of the bell-crank lever 132 causes the prism cage 122 and prism 120 to move from the position shown in Figure 1 to the dotted line position thereof, reciprocating vertically within the guide frame 123 and extension 126.

Mounted adjacent an aperture 139 in the upper end of the guide frame 123 is a right-angle prism 140. The casing extension 120 terminates in an annular recess 141 containing an eye-piece lens cell 142 having a threaded counterbore 143 carrying a threaded retaining ring 144 which holds an eye-piece lens 145 within the counterbore 143 against an annular flange 146. The casing extension 127 terminates in an inwardly-extending annular flange 147 forming a window for the eye of the user. In order to exclude extraneous light, a conventional tubular eye cup or shade (not shown) of rubber or other suitable material, may be mounted on the end of the casing extension 120. For purposes of simplification, the eye-piece lens system has been shown as consisting of a single double-convex lens 145, whereas in actual practice, this lens may consist of several components, as is well known in the optical instrument art.

Mounted behind the prism cell 122 is an extension 148 of the frame structure 18 is a shutter 149 which reciprocates horizontally in a recess 150 formed in the rearward wall of a vertical plate-like portion 151 integral with the frame extension 148 (Figures 1 and 4). The portion 151 is provided with a central aperture 152 of rectangular outline across which the shutter 149 reciprocates, the latter being provided with a vertical slit 153 for exposing the film 154 placed behind it in a magazine 155. The magazine 155 is provided with a forward flanged portion 156 secured by the screws 157 to the portion 151 and thereby retaining the shutter 149 within its recess 150. The shutter 149 is provided with a pin 158 (Figure 4) forming a handle by which the shutter may be moved to its set position prior to making an exposure.

The shutter 149 is also provided with a forwardly extending arm or catch 159 to which is attached one end of a coil spring 160, the opposite end of which is secured to an arm 161 connected to the frame structure extension 148. The catch 159 is engaged by the upper end 162 of a shutter release lever 163 (Figure 1) which extends upward into the extension 148 through a slot 164. The shutter release lever 163 is pivotally mounted upon a pivot stud 165 threaded into the plate-like portion 30 of the frame structure 18 and is provided with a coil spring 166 secured at one end to the pin 167 on the lever 163 and at the other end to a boss 168 on the inside of the casing half 13. The lower portion 169 of the shutter release lever 163 is engaged by the rearward end of the reduced diameter portion 136 of the plunger rod 57 when the push button 58 is pressed inward its full distance.

The film magazine 155 and the arrangement for handling and shifting the film 154 may be of any conventional type and its details form no part of the present invention. The film may either be in the form of a strip which is shifted laterally or vertically after every exposure or it may be wound upon spools or in any other manner desired. It is preferred that motion picture film be used, preferably color film so that a picture of the fundus in natural color may be obtained. The magazine 155 may be either unloaded in a dark room or may be daylight loaded, according to the conventional type employed.

*Brow rest*

Rising from the top of the casing extension 120 (Figure 6), is a brow rest support 170 having a horizontal bore 171 therethrough. Slidably mounted in the bore 171 is a screw-threaded rod 172, the threaded portion 173 of which is engaged by a knurled thumb-nut 174 mounted in a slot 175 in the support 170. Rotation of the rod 172 is prevented by a groove 176 therein engaged by the tip 177 of a stud 178 threaded through a hole 179 leading to the bore 171. The outer end of the rod 172 carries a pivot pin 180 which passes through ears 181 extending rearwardly from a brow rest pad 182. The latter is suitably configured to engage the brow or forehead of the patient and may have its forward surface 183 slightly concave for this purpose. To adjust the brow rest, the operator rotates the thumb nut 174 in one direction or the other, causing the rod 172 and the pad 182 to advance or recede relatively to the patient's forehead.

*Speculum*

The speculum 11 (Figures 6, 7 and 8) serves as a rest and also a support for positioning the camera 10 accurately with respect to the eyeball. For this purpose, the speculum 11 consists of a handle 184 having an annular portion 185 on the end thereof. Extending transversely from the plane of the annular portion 185 is a shallow cup portion 186 having an annular wall 187 parallel to the annular portion 185 and with a central aperture 188. Extending rearwardly at an angle to the annular portion 187 are two contact portions 189 of arcuate cross-section and partly annular form. The marginal portions of the inner surfaces 190 of the contact portions 189 are concave with a curvature approximately the same as the curvature of the eyeball adjacent the cornea. The cup-shaped portion 186 forms an annular recess 191 for the reception of the nose plate 22 of the camera 10, and is of substantially the same diameter and thickness. The forward surface 192 acts as a stop for the forward surface of the nose plate 22.

*Operation*

In the operation of the invention, the magazine 155 is loaded with suitable film 154 and placed in its position in the camera. The plug on the end of the cable 35 is connected to a suitable source of current for energizing the conductors 36 and 37. The eyeball is then anaesthetized in order to render it insensitive to the pressure of the speculum 11. The eyelids L are then lifted and the contact portions 189 of the speculum 11 inserted beneath them with the inner surfaces 190 engaging the outer surface of the eyeball E in the area or zone surrounding the cornea C. The eyeball E is then in a position for receiving light through the cornea C, the pupil P and the lens O so that the fundus F will be illuminated for viewing and photographing. It will be seen that the speculum 11 projects forward a sufficient distance so that the cornea C is free from contact with any portion of the speculum 11.

The operator then grasps the handle portion 34 in his hand and places the nose plate 22 in its socket 191 in the front part of the speculum 11, so that it comes to rest against the surface 192. The camera 10 is now placed accurately in position with respect to the fundus F to be photographed. The operator now adjusts the brow rest pad 182 by moving it to and fro until it engages the brow B and provides an additional steadying point for the camera 10, this being done by rotating the knurled thumb nut 174.

The optical and mechanical parts of the camera 10 are now in the position of Figure 1, with the prism 121 intercepting the rays which would otherwise pass from the photographic objective 115 to the film 154. When these adjustments have been made and the camera is properly positioned, the operator closes the switch (not shown) which energizes the conductors 36 and 37 in the cable 35. The current then flows through the circuit consisting of the conductors 37 and 80, the resistor 78, the conductor 76, the spring arm 72, contact 71, band 62, contact 63, spring arm 64, conductor 69, filament 42 of the lamp 40 and conductor 36. The circuit thus established lights the filament 42 of the lamp 40 with its normal brilliance.

Light from the filament 42 follows the path indicated by the chain line in Figure 6. It passes through the condensing lens system 87 and is reflected by the prism 93 through the aperture 24 and the speculum aperture 188 into the interior of the eye E, illuminating the fundus F. The light which is directly reflected from the cornea C acting as a convex mirror, is intercepted by the bridge portion 96 of the nose plate 22 and is prevented from entering the camera. The light reflected from the fundus F, however, retraces its path through the eye E and passes through the aperture 23 into the interior of the camera. There it is refracted by the lens 115 and twice reflected by the prisms 121 and 140 and finally passes through the eyepiece lens 145 into the eye of the operator. Thus, the light follows the path indicated by the chain line in Figure 6.

As the operator observes the image of the fundus through the eyepiece lens 145, he racks the lens mount 103 back and forth by rotating the knurled head 114 on the pinion shaft 110 until the image seen through the eyepiece lens 145 is sharply focussed. The optical elements in the viewing system 98 are so spaced and mounted relatively to the photographic objective 115 that when the image formed by the latter is in sharp focus when viewed through the eyepiece lens 145, it will also be in sharp focus upon the film 154 when the prism 121 is moved aside and the shutter 149 is tripped to make the exposure.

Thus, when the operator has focussed the image of the fundus sharply by means of the hand wheel or knurled head 114, he depresses the push button 58 to make the exposure. In so doing, he pushes the plunger rod 57 rearward (Figure 1) against the urge of the coil spring 60, consequently moving the conducting band 62 rearward so that it breaks the circuit between the contacts 71 and 63 and closes the circuit between the contacts 84 and 65. This shunts out the resistor 78 so that the full voltage is supplied to the filament 42 instead of a reduced voltage by way of the resistor 78 as before. This causes the filament 42 to be overloaded and therefore "super-illuminated" with an abnormally high intensity of light. This high intensity light, however, flashes only momentarily upon the fundus F as the plunger rod 51 continues its rearward motion and the band 62 breaks the circuit between the contacts 65 and 84.

Immediately before the latter circuit is broken, however, the pin and slot connection 135, 134 between the end portion 136 of the plunger rod 57 and the bell crank lever 132 swings the latter around its pivot stud 137 and moves the prism cell 122 and prism 121 downward into the chain line position of Figure 1, removing the prism 121 from the path of the rays leaving the photographic objective 115. As the plunger rod 57 continues its rearward motion, the end of the portion 136 engages and swings the lower portion 169 of the shutter release lever 163, moving it out of engagement with the catch 159 on the shutter 149. Under the influence of the spring 160, the slit 153 of the shutter 149 moves rapidly past the film 154, exposing the film and recording the image of the fundus upon the film 154.

The film is then changed or transported to bring an unexposed portion into the focal plane of the magazine 155 in the manner customary in such magazines and forming no part of the present invention. The operator also resets the shutter by grasping the pin 158 (Figure 4) and sliding the shutter into the position shown in Figure 4 until the arm or catch 159 clicks past the upper end 162 of the shutter release lever 163, and is locked in position by the latter, ready for a new exposure to be made.

In order to definitely locate the portion of the fundus being photographed and to keep the eyeball motionless during the exposure, the patient is requested to fix his gaze on the illuminated spherical knob 53 upon one of the vertical rods 51 (Figure 2). If stereoscopic photographs are to be taken, the patient fixes his gaze on one knob 53 for one exposure and upon the other knob for a subsequent exposure, the two exposures being then developed, printed, mounted and viewed in a stereoscope.

It will be understood that the prisms 93, 140 and 121 may be replaced by mirrors if it is so desired. It will also be obvious that the camera objective 115 may be focussed by means other than the rack 108 and pinion 109, such as, for example, by a conventional spiral screw mount.

The modification shown in Figure 9 is intended to replace the fixation rods 51 with their knobs 52. It consists of a sliding sleeve 195 mounted in a pair of aligned bores 196 in the opposite side walls of the casing halves 13 and 14. The sleeve 195 terminates in flanges 197 and 198 and is of a greater length than the width of the casing 12, so that it may be slid from side to side.

The sleeve 195 is provided at its mid-portion with an elongated slot 199 leading to the longitudinal bore 200. Reciprocably mounted in the bore 200 is a rod 201 having flanged portions 202 and 203 at the opposite ends thereof. The rod 201 is longer than the sleeve 195 so as to be slidably axially thereof by an amount equal at least to the length of the slot 199. The rod 201 is provided with a transverse hole 204 in which is mounted the butt of a fixation needle 205 which projects through the slot 199 with its pointed tip 206 substantially on the optical axis of the condensing lens system 87 and at the principal focus of the condensing lens 90.

The needle 205 thus is located substantially in the plane 9—9 in Figure 1. When the fixation device shown in Figure 9 is built into the instrument, the fixation knobs 53 and their rods 51 are omitted, along with the holes 52 through which they pass.

In the operation of the camera equipped with the modified fixation device of Figure 9, when the patient looks toward the aperture 24 in the nose plate 22, he sees an image of the needle 205, illuminated by the electric light bulb 40. Since the needle 205 is located at the prinicpal focus of the condensing lens system 87, rays emerging from the prism 93 are parallel and hence fall on the retina of an eye focussed for infinity. Thus, the patient fixes his gaze upon the image of the needle 205 rather than upon the fixation knobs 53 as in the principal form of the invention shown in Figure 1.

By sliding the sleeve 195 and rod 201 so as to move the needle 205 into the various positions indicated by the dotted line in Figure 9, as well as by the solid line position therein, the camera may be adjusted for photographing the fundus either of the right eye or the left eye, as well as for making stereoscopic views of the same eye.

What I claim is:

1. A fundus camera comprising a box-like casing having a forward portion projecting forwardly from the remainder of said casing, said forward portion having a nose member with a pair of adjacent openings, a photographic system in said casing having an objective lens spaced rearwardly of said nose member and aligned with one of said openings, an illuminating system in said casing aligned with the other of said openings and including a projection lens, a camera positioning device for locating the camera at a predetermined position in front of the eye being photographed, including a camera locating element interposed between said casing and a portion of the patient's head containing the eye being photographed, an opaque light-masking element between said openings positioned in the path of the rays from said illuminating system reflected from the cornea of the eye being photographed, an illuminated fixation object in said casing arranged in the focal plane of the projection lens of the illumination system for illumination thereby.

2. A fundus camera comprising a box-like casing having a forward portion projecting forwardly from the remainder of said casing, said forward portion having a nose member with a pair of adjacent openings, a photographic system in said casing having an objective lens spaced rearwardly of said nose member and aligned with one of said openings, an illuminating system in said casing aligned with the other of said openings and including a projection lens, a camera positioning device for locating the camera at a predetermined position in front of the eye being photographed, including a camera locating element interposed between said casing and a portion of the patient's head containing the eye being photographed, an opaque light-masking element between said openings positioned in the path of the rays from said illuminating system reflected from the cornea of the eye being photographed, an illuminated fixation object in said casing arranged in the focal plane of the projection lens of the illumination system for illumination thereby, and a laterally shiftable support carrying said fixation element.

JOHN H. McMILLIN.

REFERENCES CITED

The following references are of record in the file of this patent:

UNITED STATES PATENTS

| Number | Name | Date |
|---|---|---|
| 1,331,627 | Dilts | Feb. 24, 1920 |
| 1,505,268 | Larson | Aug. 19, 1924 |
| 1,548,780 | Herbert, Jr. | Aug. 4, 1925 |
| 1,605,725 | Herbert, Jr. | Nov. 2, 1926 |
| 1,741,526 | Kuhl | Dec. 31, 1929 |
| 1,760,208 | Pfeiffer | May 27, 1930 |
| 2,257,331 | Clarke | Sept. 30, 1941 |
| 2,279,795 | Nissel | Apr. 14, 1942 |
| 2,280,561 | Wappler | Apr. 21, 1942 |
| 2,283,769 | Schwanzel | May 19, 1942 |
| 2,360,768 | French | Oct. 17, 1944 |
| 2,400,483 | Cameron | May 21, 1946 |
| 2,430,851 | Allen | Nov. 18, 1947 |
| 2,441,370 | Pearce | May 11, 1948 |

OTHER REFERENCES

Journal of The Optical Society of America, March 1945, pages 187 to 189 inclusive.